United States Patent [19]
Maria van Hout et al.

[11] Patent Number: 5,182,361
[45] Date of Patent: Jan. 26, 1993

[54] METHOD FOR THE CONTINUOUS PREPARATION OF AROMATIC POLYCARBONATE HAVING A HIGH MOLECULAR WEIGHT WITH STATIC MIXER AND PLUG FLOW

[75] Inventors: Hendricus H. Maria van Hout, Halsteren; Martin H. Oyevaar, Goes; Bert J. Held, Bergen op Zoom, all of Netherlands

[73] Assignee: General Electric Company, Mt. Vernon, Ind.

[21] Appl. No.: 736,884

[22] Filed: Jul. 29, 1991

[30] Foreign Application Priority Data

Aug. 29, 1990 [NL] Netherlands .................. 9001887

[51] Int. Cl.$^5$ .............................................. C08G 64/20
[52] U.S. Cl. ..................... 528/371; 528/370
[58] Field of Search .................. 528/371, 370

[56] References Cited

U.S. PATENT DOCUMENTS

| | | | |
|---|---|---|---|
| 4,743,676 | 5/1988 | Silva et al. | 528/371 |
| 4,959,456 | 9/1990 | Ashida et al. | 528/371 |
| 4,973,664 | 11/1990 | Silva | 528/371 |

*Primary Examiner*—Harold D. Anderson
*Attorney, Agent, or Firm*—Martin B. Barancik

[57] ABSTRACT

The invention relates to a method of preparing aromatic polycarbonate having a high molecular weight by boundary face condensation of carbonate oligomer in the presence of an aromatic monohydroxy compound as a chain stopper, base, water and organic solvent at a temperature of at most 70° C., in which the components, among which the chain stopper, are mixed in static mixers to form a fine dispersion, reacting these in a residence zone with plug flow and repeating these steps at least once.

7 Claims, No Drawings

METHOD FOR THE CONTINUOUS PREPARATION OF AROMATIC POLYCARBONATE HAVING A HIGH MOLECULAR WEIGHT WITH STATIC MIXER AND PLUG FLOW

The invention relates to a method for the continuous preparation of aromatic polycarbonate having a high molecular weight by boundary face condensation of a carbonate oligomer with catalyst in the presence of an aromatic monohydroxy compound as a chain stopper, base, water and organic solvent at a temperature of at most 70° C.

Various methods of performing such a method have already been described. Dichloromethane is generally used in industry as a solvent in such methods.

A slightly differing method is described in British Patent Specification 1,455,976, in which it is suggested to perform the two phases—the oligomer formation and the polycondensation—in a chlorinated aromatic solvent, in particular chlorobenzene, and at a temperature above 70° C. The temperature of the polycondensation in the specific examples is always above 80° C. The chain stopper is added already at the beginning of the oligomer formation, which has for its disadvantage that a part thereof reacts with phosgene and an undesired by-product is formed. The polymer condensation is carried out by adding base and, optionally, a further quantity of amine catalyst to the resulting oligomer mixture and passing the assembly in a tubular reactor through diaphragms and residence zones.

According to U.S. Pat. No. 3,974,126 the polycondensation reaction is carried out by feeding all the components by means of supply pumps in an inlet duct and from there through perforated plates and residence zones of a tubular reactor, in which first turbulent flow occurs, but in the last part laminar flow occurs. As appears from the examples, the reaction times are excessively long.

EP-A-0 304 691 describes a method which again differs slightly from the concept given in the opening paragraph in that in the first phase not an oligomer but a pre-polymer having a molecular weight of 4,000-12,000 is prepared. In connection therewith chain stopper is also added already at the beginning, as a result of which a part thereof is again lost as a result of reaction with the phosgene and undesired by-product is formed.

According to U.S. Pat. No. 4,122,112 the oligomer is further polymerised continuously in a polymerisation reactor of the tank type. As appears from the examples, the reaction time is excessively long. The chain stopper has already been added in the preparation of the oligomer, which results in the disadvantages mentioned hereinbefore.

U.S. Pat. No. 4,737,573 describes a method in which the polycondensation is carried out inter alia in a continuously stirred tank reactor (CSTR). In discontinuous operation a reaction time in the order of 20 minutes is necessary. According to this publication the reaction may also be carried out continuously by arranging a further reaction system with plug flow and restricted back-mixing after the CSTR.

According to U.S. Pat. No. 4,743,676 the aromatic monohydroxy compound serving as a chain stopper is added after the formation of di- or oligomer and the polycondensation is then carried out. The whole is carried out in a stirring vessel and the reaction times in the examples are excessively long.

It has now been found that the polycondensation of oligomers having molecular weights of 400-4,000 can be carried out rapidly and efficaciously by mixing the required components in a static mixer and then causing them to flow in a plug flow through a residence zone and repeating the said cycle at least once.

The invention therefore relates to a method of the type mentioned in the opening paragraph which is characterised in that the polycondensation is carried out by mixing the oligomers in static mixers to form a fine dispersion and causing them to react in a residence zone with plug flow and repeating this combination at least once.

A few further advantages of the present method are a constant, good quality of the resulting polycarbonate, also due to the fact that the chain stopper is added only in the stage of the polycondensation, which has the additional advantage of an efficient use of the chain stopper.

Starting products for the preparation of aromatic polycarbonates are aromatic dihydroxy compounds. Among these, 2,2-bis(4-hydroxyphenyl)propane—also known as bisphenol A— is to be preferred most. However, any other dihydroxyaromatic compound may also be used, and for examples thereof reference is made to U.S. Pat. No. 4,737,573, column 3, line 41 to column 4, line 38.

The further components are also those which are conventionally used. For example, an aromatic monohydroxy compound, in particular a monovalent phenol, is used as a chain stopper, for example, phenol itself or para-cumylphenol. The organic solvent is preferably dichloromethane, which is usual. The pH of the aqueous-organic system is kept in the range from 9 to 12. A trialkylamine, preferably triethylamine, is generally used as a catalyst, which is usual. The quantity of catalyst may be kept low: 500-2,000 ppm related to the organic solvent. The activities are carried out at a temperature of at most 70° C., preferably 10°-60° C. The polymer is obtained in a solid-state content of 15-25% in the ultimate organic solvent.

The residence time in the zones with plug flow may range from 10 to 120 seconds.

The steps of mixing and flowing in plug flow are preferably repeated a number of times, in particular from 5 to 15 times.

It is also possible to use in the present method the modification of U.S. Pat. No. 4,743,676, that is to say it is possible either to directly mix in the first static mixer the oligomerisation product which comprises water, organic solvent, base, and a small quantity of catalyst, with the required further quantity of base, the required further quantity of catalyst and the chain stopper, or it is possible first to mix in the first static mixer the oligomerisation product with the chain stopper, a small quantity of base and catalyst, and then to add in one or more steps downstream the remaining quantity of base and catalyst required for further polymerisation.

It is also possible first to convert the oligomer-isation product with the chain stopper before the polycondensation is carried out.

EXAMPLE 1

Oligomers were prepared in a stirring vessel while using 350 g of bisphenol A in 1.02 of dichloromethane (MeCl2) and 400 ml of water with 197 g of phosgene.

The pH was kept at 9.0 by means of 33% by weight sodium hydroxide solution and the temperature was controlled by evaporation and condensation of MeCl2. After termination of the phosgenisation the oligomer mixture was partly provided with terminal groups under controlled conditions by means of phenol. The resulting oligomer mixture had an average molecular weight in the range from 600 to 1,000; approximately 99.7%±0.1% of the bisphenol A had been converted.

The polycondensation of the resulting oligomer mixture partly provided with terminal groups was carried out in a reactor loop of a residence zone with plug flow and a set of 5 series-arranged static mixers having a diameter of 3.2 mm. The reactor (having a total volume of 0.3 liter) was immersed in a water bath the temperature of which was maintained at 40° C. The mixture was then circulated in a quantity of 13 l/h by means of a hose pump. After the addition of sufficient triethylamine and lye to obtain polymerisation, the intrinsic viscosity (IV) and the molecular weight ($\overline{Mw}$) of the polymer product and the conversion of BPA as a function of the reaction time were supervised. The results are summarised hereinafter.

| Reaction time (min.) | IV (ml/g) | $\overline{Mw}$ | % conversion of bisphenol A |
|---|---|---|---|
| 3 | 49.0 | 24100 | 99.97 |
| 5 | 49.0 | 24350 | >99.99 |
| 7 | 49.0 | 24250 | >99.99 |

It will be apparent from this example that a good build-up of molecular weight is obtained when using the applied combination of prop flow and static mixers with a reaction time of 5 minutes. Moreover, the remaining bisphenol A was sufficiently incorporated with ultimately a good overall bisphenol A conversion.

EXAMPLE 2

In this example the oligomer mixture was prepared in the same manner as described in Example 1, in which, however, the chain stopper was not added to the oligomer mixture in the stirring vessel, but only in the reaction loop. In this example only 100 ppm of triethylamine (wt/vol MeA2) and 4.5 mol % phenol were added per mol of original bisphenol A. This quantity is effective to incorporate the chain stopper, but it is not sufficient to obtain an effective polymerisation.

After the addition of triethylamine, phenol and lye the conversion of bisphenol A and of phenol as a function of the reaction time was followed. The results are summarised hereinafter.

| Reaction time (min.) | % conversion bisphenol A | % conversion phenol |
|---|---|---|
| 1 | 99.9 | 91 |
| 3 | 99.9 | 95 |

These conversions are sufficiently high to obtain a complete conversion of the bisphenol A and the phenol in the further polymerisation while adding more catalyst and lye. So this example demonstrates the posibility of incor-porating the chain stopper in the reaction loop.

EXAMPLE 3

Oligomers were prepared in a 2,000 stirring vessel starting from 91 kg of bisphenol A, 275 l of MeCl2, 125 l of water and 50 ppm of triethylamine (wt/vol MeCl2) with 52 kg of COCL2. The pH was kept at 9.0 by means of 50 wt. % lye and the temperature was controlled by evaporation and condensation of MeCl2. After termination of the phosgenisation reaction the oligomer mixture was partly provided with terminal groups by means of phenol. The resulting oligomer mixture had an average molecular weight in the range from 600 to 1,000.

The oligomer mixture provided partly with terminal groups was subjected to a continuous polycondensation in a tubular reactor of 25.5 l with 5 blocks of each 3 static mixers having a diameter of 12.7 mm. The total residence time was 3.5 minutes, the added quantity of triethylamine was 1.5 mol %, related to the bisphenol A, and the pH was kept at 10–11.5. In a number of representative preparations according to this method, phenol contents in the aqueous phase were obtained herewith of less than 20 ppm. Total extraction of the product mixture showed contents of free bisphenol A of less than 200 ppm, related to the polymer. The IV and the Mw of the isolated product were 45.0 ml/g and 23,200, respectively.

We claim:

1. A method for the continuous preparation of aromatic polycarbonate having a high molecular weight by boundary face condensation of carbonate oligomer with catalyst in the presence of an aromatic monohydroxy compound as a chain stopper, base, water and organic solvent at a temperature of at most 70° C., comprising polycondensing is carried out by mixing components, in static mixers to form a fine dispersion and reacting the dispersion in a residence zone with plug flow and repeating this combination of steps at least once.

2. A method as claimed in claim 1, characterised in that the combination of steps is repeated from 5 to 15 times.

3. A method as claimed in claim 1, characterised in that the organic solvent, water, base and a small quantity of catalyst comprising oligomerisation product are mixed in the first static mixer with a further quantity of base, a further quantity of catalyst and the chain stopper.

4. A method as claimed in claim 1, characterised in that the organic solvent, water, base optionally with a small quantity of catalyst containing oligomerisation product are mixed in the first static mixer with the chain stopper, a portion of the base and a small quantity of catalyst, adding the remaining quantity of base and catalyst in one or more of the subsequent static mixers.

5. A method as claimed in claim 1, characterised in that the carbonate oligomer is first converted with the aromatic monohydroxy compound prior to polycondensation.

6. A method as claimed in claim 2, characterised in that the organic solvent, water, base and a small quantity of catalyst comprising oligomerisation product are mixed in the first static mixer with a further quantity of base, a further quantity of catalyst and the chain stopper.

7. A method as claimed in claim 2, characterised in that the organic solvent, water, base optionally with a small quantity of catalyst comprising oligomerisation product are mixed in the first static mixer with the chain stopper, a portion of the base and a small quantity of catalyst, adding the remaining quantity of base and catalyst in one or more of the subsequent static mixers.

* * * * *